Figure 1:
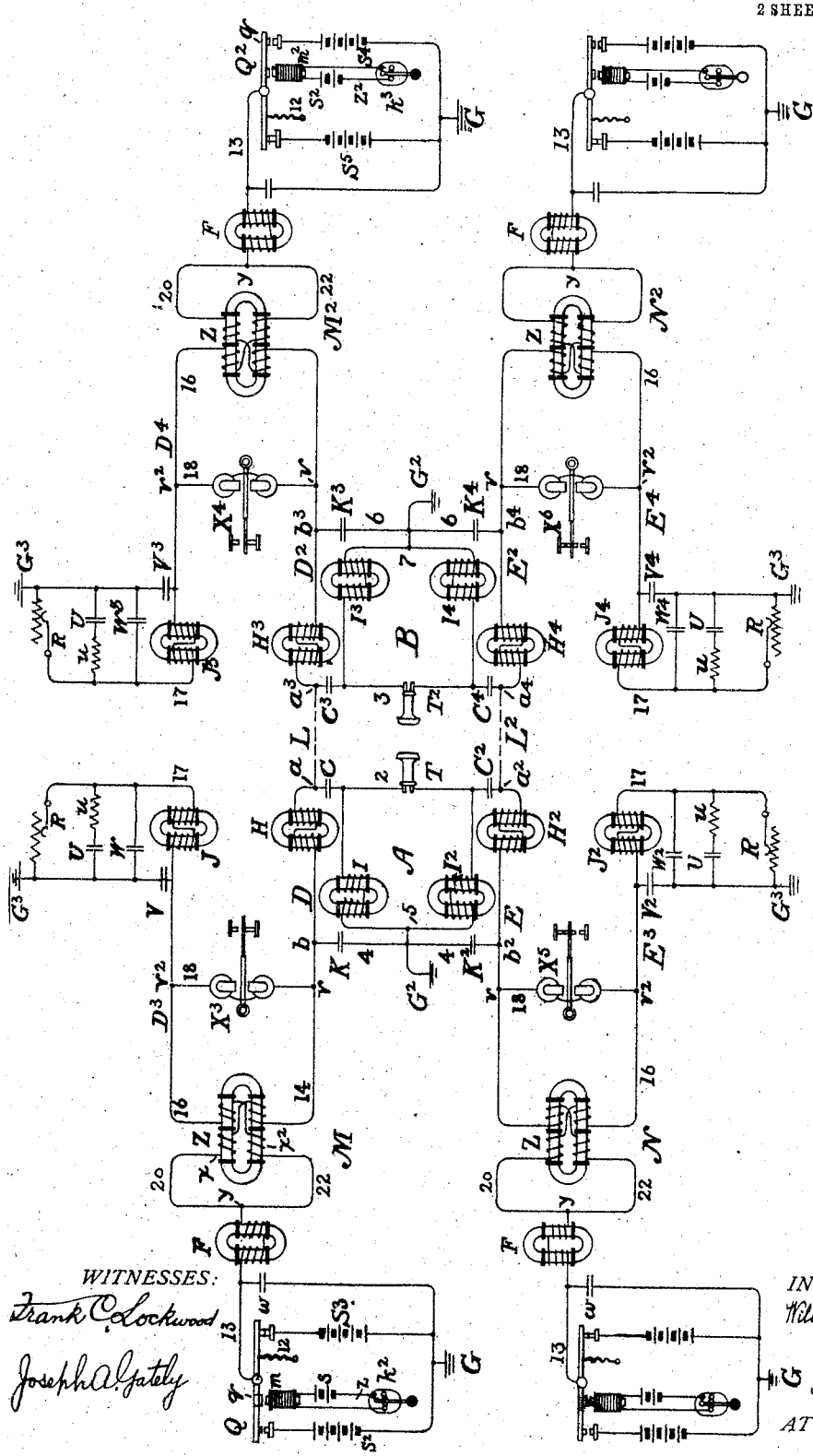

No. 778,297. PATENTED DEC. 27, 1904.
W. E. ATHEARN.
COMPOSITE SYSTEM DUPLEX TELEGRAPH CIRCUITS.
APPLICATION FILED MAY 13, 1904.

2 SHEETS—SHEET 1.

WITNESSES:
Frank C. Lockwood
Joseph A. Gately

INVENTOR.
William E. Athearn
by
Thos. D. Lockwood
ATTORNEY.

No. 778,297. PATENTED DEC. 27, 1904.
W. E. ATHEARN.
COMPOSITE SYSTEM DUPLEX TELEGRAPH CIRCUITS.
APPLICATION FILED MAY 13, 1904.

2 SHEETS—SHEET 2.

WITNESSES:
Frank C. Lockwood.
Joseph A. Gately.

INVENTOR.
William E. Athearn
by
Thomas D. Lockwood.
ATTORNEY.

No. 778,297. Patented December 27, 1904.

UNITED STATES PATENT OFFICE.

WILLIAM E. ATHEARN, OF NEW YORK, N. Y., ASSIGNOR TO AMERICAN TELEPHONE AND TELEGRAPH COMPANY, A CORPORATION OF NEW YORK.

COMPOSITE SYSTEM DUPLEX-TELEGRAPH CIRCUITS.

SPECIFICATION forming part of Letters Patent No. 778,297, dated December 27, 1904.

Application filed May 13, 1904. Serial No. 207,842.

*To all whom it may concern:*

Be it known that I, WILLIAM E. ATHEARN, residing at New York, in the county of New York and State of New York, have invented certain Improvements in Composite System Duplex-Telegraph Circuits, of which the following is a specification.

"Composite" transmission is a generally-accepted term technically assigned to systems for the electrical transmission of intelligence wherein telegraphic and telephonic messages are or may be transmitted simultaneously over and by means of the same conductors.

A "duplex" telegraph system is one wherein two messages may be transmitted in opposite directions over the same circuit at the same time.

This invention relates generally to an improvement in composite transmission wherein two conductors serve together, joined at their ends, as the outgoing and return conductors of a telephonic circuit and severally as the main lines or conductors of two earth-completed telegraphic circuits, respectively, and in particular to a plan for duplexing one or both of the said telegraphic single-conductor circuits.

In duplex systems of telegraphy an agency technically entitled an "artificial line" is generally employed, the fundamental feature of such systems being that the receiving instrument at each terminal telegraph-station must be so placed or arranged with reference to the main-line conductor and the said artificial line that it shall be absolutely neutral and irresponsive with respect to outgoing currents, while remaining fully responsive to the transmitted currents of the distant station, which for practical purposes in its relation to the receiving instrument circulate in the main line only.

Although composite systems of transmission and duplex arrangements of telegraphy are both of themselves well known and regularly employed and while attempts have been made to work them together, such attempts have not hitherto been perfectly successful, and either the telephonic part of the system has been interfered with and deteriorated or else the multiple-telegraph side of the system has been inefficient and imperfect.

The object of the present invention is to establish a perfectly-operating and highly-efficient duplex arrangement in connection with either or both of the telegraphic circuits of a composite system without in any sense or degree adversely affecting the telephonic portion of said system. To this end I employ the bridge system of duplex telegraphy in preference to the differential plan, and instead of availing myself of simple balancing resistances in what I term the "station-arms" of the Wheatstone's bridge system or balance I employ electromagnetic resistance or reaction coils. The telegraphic receiving instrument in this composite duplex system is in a bridge or cross-wire between the main and artificial lines, and the said electromagnetic or reaction coils are connected in the said station-arms of the bridge system between the said instrument-bridge or cross-wire points of connection and the transmitting devices, which are adapted to send similar current impulses over the main and artificial lines together. The receiving-instrument bridge is connected with the said main and artificial lines at equipotential points as respects the current impulses of outgoing signals; but as the incoming current impulses reach the instrument through the main line only the potential at the bridge-terminals is diverse for them, and the instrument is thus perfectly responsive to currents and signals transmitted from the distant station. Moreover, the reaction-coils in the station-arms of each station bridge system are so wound or connected as to be differential to outgoing and serial to incoming currents.

Figure 2:
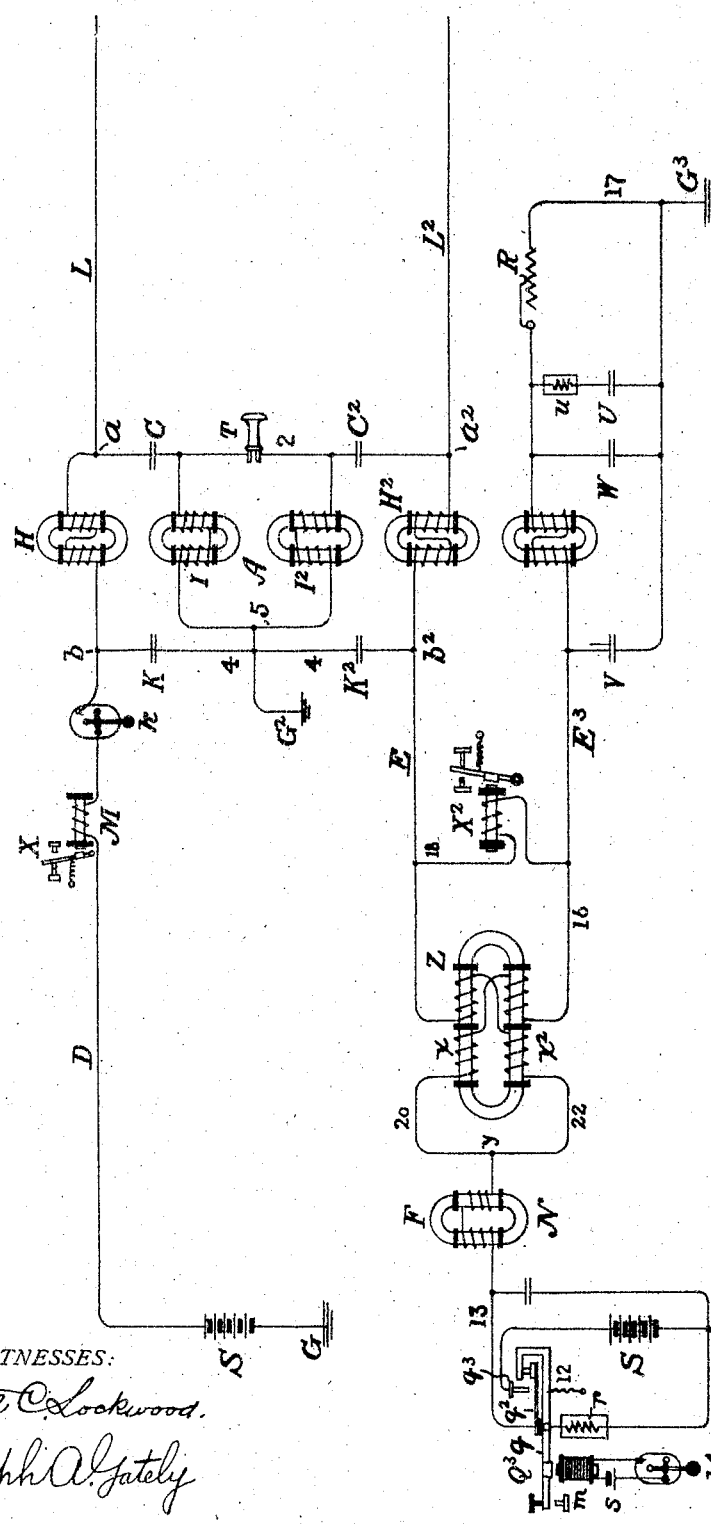

In the drawings which accompany this specification, Figure 1 is a diagram conventionally illustrating a composite system complete, wherein a polar bridge-duplex is applied to both telegraphic circuits of said system; and Fig. 2 is a diagram of the electrical connections of one end only of such a system, wherein but one of the telegraphic circuits is duplexed and wherein the duplex arrangement is of the single-current or make-and-break type.

In the drawings the terminal telephone-stations A and B are united by the parallel main conductors L L$^2$, serving as the outgoing and return conductors of the metallic telephone-circuit, which conductors are joined at the said stations, respectively, through the looping conductors 2 and 3, the telephone instruments T T$^2$, and the condensers C C$^2$ C$^3$ C$^4$, one on each side of each telephone outfit. In association with their extension or earth terminal branches D D$^2$ E E$^2$ the said main conductors constitute separate earth-completed telegraphic circuits, uniting, respectively, the stations M M$^2$ and N N$^2$.

H H$^2$ H$^3$ H$^4$ represent electromagnetic resistances or choking-coils introduced into the telegraphic extensions D E D$^2$ E$^2$ of the line conductors L L$^2$ between the diverging points $a$ $a^2$ $a^3$ $a^4$ of the telephone-loops and the telegraphic apparatus in a manner well understood to prevent the short-circuiting of the voice-currents between the two telegraphic-circuit earth-terminals G at the same end of the composite system and to graduate or round off the abruptness or sharpness of the telegraphic signal-current impulses, so that they may be prevented from interfering with the operation of the telephones.

The condensers K K$^2$ K$^3$ K$^4$ are in conductors 4 6 from the telegraphic extensions D E D$^2$ E$^2$, branching at points $b$ $b^2$ $b^3$ $b^4$ to earth at G$^2$ between the inductive resistances H H$^2$, &c., and the telegraphic apparatus, and auxiliary inductive resistance-coils I I$^2$ I$^3$ I$^4$ are in similar branches 5 and 7, extending to said ground connection from points on the telephone loop conductor on the two sides of the telephone instruments, respectively, the purpose of these condensers, coils, and earth branches being to aid the principal coils and condensers in graduating the telegraphic currents to facilitate the diversion of disturbing currents from the telephones and to assist in relieving the lines from static charge.

In Fig. 2 the telegraphic extension D of line conductor L to the telegraph-station M is shown as being arranged for ordinary or simplex operation. It extends from the point $a$ to earth at G and is equipped with the source of current S, the sending-key $k$, and any appropriate receiving instrument X. The other main conductor, L$^2$, of the circuit in Fig. 2 and both conductors L and L$^2$ in Fig. 1 are shown as being arranged for duplex operation upon the bridge system.

The two bridge-duplex systems shown in Fig. 1 are arranged and work alike, both being of the "polar-duplex" type, and to describe one of them will therefore be sufficient.

Q Q$^2$ at stations M and M$^2$ are pole-changing transmitters controlled by the keys $k^2$ $k^3$ in the local circuits $z$ $z^2$ of the batteries $s$ $s^2$ through the intermediation of the electromagnets $m$ $m^2$, which are connected in the said local circuits, respectively. These transmitters control the connection of the working telegraphic circuit with the oppositely-poled batteries or like sources of current S$^2$ S$^3$ at station M and S$^4$ S$^5$ at station M$^2$, thus establishing upon the circuit plus and minus current impulses alternately. When the key is depressed and the local circuit closed, the electromagnet is excited and attracting its armature brings the transmitter-lever $q$ into contact with the source S$^2$, so that a positive current impulse passes to the main circuit; but when the said key is opened the lever is retracted by its spring 12, and a negative pulsation passes to the main circuit.

As previously stated, the main telegraph-line is formed of the line conductor L or L$^2$ and their telegraphic terminal extensions D D$^2$ or E E$^2$. Referring, for example, to the line L, we find that its course from the transmitter Q to the distant receiver may be thus traced: transmitter-lever $q$, conductor 13, point $y$, conductor 14, extension conductor D, line conductor L, and extension conductor D$^2$ at station M$^2$ to one terminal $v$ of the receiving-instrument bridge at such station.

D$^3$ D$^4$ indicate the artificial lines at the two ends of main-line conductor L, and E$^3$ E$^4$ the corresponding artificial lines at the stations N N$^2$ of the main-line conductor L$^2$, the said artificial line in each case passing to earth at its own station.

G indicates the earth connections at the several telegraph-stations associated with the transmitting apparatus, G$^2$ the earth connections associated with the interference-preventing system of the telephone-circuit at the stations thereof, and G$^3$ the earth connections of the several artificial lines. The said artificial lines in each case diverge from the common transmitter-conductor 13 and the corresponding main line at the point $y$ and reach their earth-terminals G$^3$ by the conductors 16 and 17.

The artificial line at each station must be similar in its several magnitudes and characteristics to the main line with which it is associated and must, indeed, balance the same as regards the outgoing currents of transmission. Thus each artificial line contains an adjustable resistance or rheostat R to balance the resistance of the main line and unless said main line is very short, indeed, the condenser U and associated resistance $u$ to balance and compensate for its varying statical capacity and condition.

In the general description of the telephonic part of the composite system mention was made of the condensers K K$^2$ C C$^2$, &c., and electromagnetic coils H H$^2$, &c. These also to obtain good results must be balanced by counterpart appliances in the corresponding artificial line, which accordingly is provided with the condenser V, balancing the condenser K, the condenser W, balancing the condenser C, and the electromagnetic coil J, balancing or offsetting the corresponding main-line coil H.

The receiving instruments $X^3$ $X^4$, &c., of the several telegraph-stations in Fig. 1 are shown as being polarized relays, and in operation their armatures move from either resting or forward position to the other the very instant that the current on the line, regardless of its direction, is disestablished by the action of the distant transmitter and before the current of reversed direction is established upon the circuit by the completed stroke of said transmitter. This quickness of action in either direction is due to the reactive discharge of the associated electromagnetic resistance Z. The said receiving instruments are in bridges or cross-wires 18, extending between and uniting points $v$ $v^2$ on the main and artificial lines, respectively. These points are at equipotential as regards the outgoing telegraphic currents, since the resistance and capacity of the real line are exterior to the point $v$ and are balanced by those of the artificial line exterior to point $v^2$ and since the electrical properties of the two sides of the circuit on the home side of points $v$ and $v^2$ are alike. The receiving instrument is thus neutral to outgoing currents; but since the current impulses coming into any station from another arrive over the main line only and can only reach the point $v^2$ of the artificial line through or round the receiving instrument the said points are of diverse potential as regards incoming currents, and while the receiver is null to the outgoing currents established upon the circuit by the transmitter of its own station it is perfectly responsive to the incoming currents thrown upon the circuit by the transmitter at the other station.

The grounded condenser associated with each transmitter aids in preventing sparks at the pole-changing lever-contacts.

The electromagnetic coil F is introduced in the common conductor 13, leading from the transmitter Q to the point $y$, where the main and artificial lines diverge, for the purpose of lessening the unpleasant noises in the telephones of the circuit when in the operation of long lines it becomes necessary to employ comparatively high electromotive forces to produce the requisite current for the telegraphic signals. When the lines are short, this coil may be omitted.

The characteristic features of this invention are the electromagnetic resistance devices or reaction-coils Z, which in the application of a bridge-duplex to the telegraphic circuit or circuits of a composite telegraphic and telephonic system are connected in the main and artificial lines thereof. Preferably the two windings $x$ $x^2$, placed in the said main and artificial lines, respectively, may be wound over the same magnetic core, which may have a closed magnetic circuit, the windings being arranged, as shown, in alternate sections and care being taken that the said two windings are substantially alike. Moreover, it is important that the said windings shall be so wound or connected as to act differentially to the outgoing currents, but shall be in series as regards the incoming currents. When simple resistance-coils are thus employed to determine the null condition of the bridged receiving instrument to outgoing currents, they largely act also as a low-impedance shunt-path for the said instrument and tend to divert away therefrom a considerable portion of the incoming current; but when in accordance with this invention electromagnetic coils are employed, and particularly when they are arranged as described, the impedance offered to the outgoing current is reduced to a minimum, while that presented to incoming currents is at its maximum, and a much greater portion of the said incoming current is diverted through the bridge or cross-wire and its receiving instrument than otherwise would be possible. Furthermore, when the station-arms 20 22 of the Wheatstone's bridge system or balance are thus fitted with inductive resistance or provided with reaction-coils the operation of the receiving instrument is improved, not only because the said receiving instrument receives a greater share of the current, but also because the self-inductive discharge of the said electromagnetic coils tends to oppose and neutralize the discharges of the magnet of the receiving instrument itself, as well as any incoming statical discharge of the line, and the action of the said receiving-instrument magnet is thereby materially accelerated.

The arrangement of Fig. 2 does not differ in any essential respect from that of Fig. 1. The chief features of difference are that the duplex system is arranged for operation by a single current and is therefore equipped with the standard continuity-preserving transmitter $Q^3$, so that the line is grounded through the coil $r$ in one position of the transmitter-lever $q$ and through the battery S in the other. When the key $k^4$ is depressed and the local circuit of battery $s$ closed, the magnet $m$ moves the transmitter-lever to its forward contact, separating the hooked end of the said lever from the contact-spring $q^2$, so that the ground connection through the said resistance $r$ (which is substantially equal to that of the battery) is severed, and bringing said spring into contact with the battery-terminal $q^3$, so that the battery is put to line. When the key is again opened, the transmitter-lever is retracted by the spring 12 and the normal conditions are restored. Since this is a single-current system, a neutral relay $X^2$ is connected in the bridge 18 to serve as the signaling instrument.

While I have herein stated that the most effective arrangement for the reactive or electromagnetic resistance placed in the station-arms of the bridge system is that wherein the windings of the said two arms, respectively, are both wound on a single iron core with a closed magnetic circuit, I do not, of course, limit myself to any such precise construction, since any form of electromagnetic or reactive resistance is more satisfactory in its operation and result than simple resistance when placed in the station-arms of a bridge-duplex applied to the telegraphic circuit or circuits of a composite transmission system.

I claim—

1. In a system of composite or conjoint telegraphy and telephony, the combination, substantially as hereinbefore set forth, with a double conductor or metallic telephone-circuit; and two single-conductor earth-completed telegraphic circuits having for their main-line conductors the two conductors respectively of the said telephone-circuit; of bridge-duplex connections for one of said telegraphic circuits; and an electromagnetic resistance or reaction device having a coil in each of the station arms or branches of the bridge and arranged to offer greater impedance to incoming than to outgoing current.

2. A system of composite or conjoint telegraphic and telephonic transmission having two main conductors, and comprising a metallic telephone-circuit constituted of both of said conductors joined at their ends through condensers; two earth-completed telegraphic circuits formed of the said two main conductors respectively and severally, both grounded at their ends; means for preventing interference between said telegraphic and telephonic circuits, and for preventing the telephone-circuit from being short-circuited through the adjacent grounded ends of said telegraphic circuits; a bridge-duplex associated with one or both of said telegraphic circuits; and electromagnetic resistances or reaction-coils in the arms or branches of said bridge and on the station side of the bridged receiving instrument, the said reaction-coils being arranged in the circuit differentially as respects the line-currents controlled by the transmitter at the same station and serially as respects the line-currents controlled by the transmitter of the distant station; substantially as set forth.

3. In a system of simultaneous telephonic and duplex telegraphic transmission over the same conductors, the combination with the main duplexed telegraphic line conductor, serving as one side of a double conductor or metallic telephone circuit; the artificial line thereof containing the usual resistances and capacities balancing those of said main line; transmitting devices for sending signal current impulses over said main line and simultaneously establishing similar current impulses in said artificial line; and a telegraphic receiving instrument bridged between said main and artificial lines at points of like potential as regards said currents; the whole being organized as a Wheatstone's bridge system or balance; of balancing electromagnetic resistances or reaction-coils connected in the station-arms respectively of said Wheatstone's balance between the instrument bridge and the said transmitting devices and arranged to offer greater impedance to incoming than to outgoing current; substantially as described.

4. The combination, substantially as specified herein, with a telegraphic-circuit main line constituting one conductor of a metallic or double conductor telephonic circuit; and a Wheatstone's bridge system of duplex connections therefor, comprising an associated artificial counterpart line conductor of proportionate resistance and capacity united at one end to the corresponding end of said main conductor, a source of current, transmitting devices connected between said source of current and the joined ends of said main and artificial lines and adapted to establish similar outgoing current impulses in each, and a receiving instrument bridged between said main and artificial lines at points of equipotential with respect to said outgoing current impulses; of an electromagnetic or inductive resistance device connected in both station-arms of said Wheatstone's bridge system, that is, in the main and artificial line conductors respectively between the joined ends of said conductors, and the connection-points of said instrument-bridge.

5. In a system of simultaneous telephonic and telegraphic transmission over the same conductors, the combination of an earth-completed telegraphic-circuit main conductor constituting one side of a metallic or double-conductor circuit and extending between two terminal telegraph-stations; and at each of said stations a bridge system of duplex connections therefor, comprising an artificial or balancing counterpart conductor of appropriate resistance and capacity united at one end to the end of said main conductor, a source of current, transmitting devices connected between said source and the joined ends of said main and artificial lines and adapted to establish similar current impulses in each, and the station-receiving instrument in a cross-conductor extended between said main and artificial lines at points of like potential in regard to the transmitted currents but diverse potential in regard to the received currents; with electromagnetic or reactive resistance-coils connected in the main and artificial line-conductor sections between the joined ends of said conductors and the connection-points of said cross-conductor which respectively form the station-arms of said bridge system, the said reaction-coils being so wound or connected as to be differential to outgoing and serial to incoming currents; substantially as set forth.

In testimony whereof I have signed my name to this specification, in the presence of two subscribing witnesses, this 9th day of May, 1904.

WILLIAM E. ATHEARN.

Witnesses:
  H. S. TENNEY,
  WALTER J. FISHER.